United States Patent [19]

Conklin et al.

[11] Patent Number: 4,457,860

[45] Date of Patent: Jul. 3, 1984

[54] USE OF HETEROCYCLIC AMMONIUM POLYAMIDOAMINES AS DEMULSIFIERS

[75] Inventors: Jerry R. Conklin; Larry R. Wilson, both of Midland, Mich.

[73] Assignee: The Dow Chemical Company, Midland, Mich.

[21] Appl. No.: 371,640

[22] Filed: Apr. 26, 1982

[51] Int. Cl.$^3$ .............................................. B01D 17/04
[52] U.S. Cl. ..................................... 252/344; 252/358
[58] Field of Search .............................. 252/344, 358

[56] References Cited

U.S. PATENT DOCUMENTS

| | | | |
|---|---|---|---|
| 3,316,181 | 4/1967 | Sackis | 252/344 |
| 3,528,928 | 9/1970 | Rushton | 252/344 |
| 3,585,148 | 6/1971 | Sackis | 252/344 |
| 3,900,423 | 8/1975 | Markofsky | 252/344 |
| 4,088,600 | 5/1978 | Tutein et al. | 252/344 |
| 4,120,815 | 10/1978 | Raman | 252/344 |
| 4,154,698 | 5/1979 | Doft | 252/344 |
| 4,179,396 | 12/1979 | Gabel et al. | 252/344 |

*Primary Examiner*—Benjamin R. Padgett
*Assistant Examiner*—Anne Brookes

[57] ABSTRACT

Emulsions of oil and water are resolved by contacting the emulsions with a heterocyclic ammonium polyamidoamine having pendant and/or backbone heterocyclic ammonium moieties, e.g., an adduct of (1) polyamidoamine prepared from methyl methacrylate and ethylenediamine and (2) epichlorohydrin.

9 Claims, No Drawings

USE OF HETEROCYCLIC AMMONIUM POLYAMIDOAMINES AS DEMULSIFIERS

BACKGROUND OF THE INVENTION

This invention relates to the use of ammonium polyamidoamines in the preventing, breaking or resolving of emulsions of the water-in-oil type as well as oil-in-water type emulsions.

Most naturally occurring emulsions of petroleum oil and water take the form of water-in-oil emulsions in which the oil is a continuous phase and tiny drops of water are dispersed in the oil. Occasionally, however, oil-in-water emulsions are encountered either in the production, handling or refining of petroleum oil or fractions thereof. Unfortunately, in both types of emulsions, the emulsions are often extremely stable and will not resolve after standing for long periods. While such emulsions often occur naturally, such emulsions may also occur artificially resulting from one or more of numerous operations encountered in various industries. For example, such emulsions may be obtained from producing wells as a result of enhanced oil recovery methods or from the bottom of crude oil storage tanks. Other such oil-in-water emulsions include steam cylinder emulsions, wax-hexane-water emulsions, butadiene-tar-in-water emulsions, emulsions of flux oil and steam condensate, styrene-in-water emulsions and synthetic latex-in-water emulsions. In all instances, it is generally desirable to resolve the emulsion in order that the oil phase may be separated from the water phase.

Historically, such emulsions have been resolved or broken by contacting the emulsion with a chemical demulsifying agent, thereby causing the emulsions to resolve and stratify into its component phases of water and oil or brine and oil after the emulsion has been allowed to stand in a relatively quiescent state. In another type of demulsification, the emulsion contains substantial quantities of salt in the aqueous phase and it is necessary to carry out a desalting operation prior to further refinement of the oil phase in order to prevent the accumulation of large deposits of salt in the refining apparatus. In such desalting operations, it is common to employ a chemical demulsifying agent in a manner similar to that mentioned hereinbefore. A wide variety of chemical demulsifying agents has been employed in this manner in the past. For example, such demulsifying agents include oxyalkylated condensation products obtained by reacting phenols, formaldehydes and alkylene polyamines as disclosed in U.S. Pat. No. 3,166,516; ultra high molecular weight ethylenically unsaturated polymers, polyalkylene oxylene polymers, polyesters, polyamides, polymer of ketenes and the like as described in U.S. Pat. No. 3,557,017; amidoamine polymers as described in U.S. Pat. No. 3,528,928; as well as other chemicals such as sulfonates; oxyalkylated amines, oxyalkylated alkylphenols, oxyalkylated alcohols and the like. While each of the foregoing and other conventional demulsifiers are effective in some emulsions, it is found that many are not as effective as desired, particularly in resolving emulsions derived from steam recovery of heavy crudes by processes typical of some of the California oil fields.

Accordingly, it is highly desirable to provide a demulsification process for resolving emulsions of such heavy crudes as well as other oil-in-water emulsions and the like.

SUMMARY OF THE INVENTION

In one aspect, the present invention is such a demulsification method which comprises contacting an emulsion of oil and water with a demulsifying amount of a water-soluble heterocyclic ammonium polyamidoamine which is a polymer having amide moieties and amine moieties in its backbone and heterocyclic ammonium moieties in its backbone and/or pendant therefrom.

While the demulsification method of the present invention is particularly effective in resolving emulsions of crude oils in water as are commonly recovered from oil fields, such demulsification method is also effective for resolving other emulsions of oil-in-water and water-in-oil.

In another aspect, the present invention is a water-soluble heterocyclic ammomium polyamidoamine which is an adduct of a linear polyamidoamine and a ammoniating compound that contains or is capable of forming a heterocyclic moiety.

DETAILED DESCRIPTION OF THE ILLUSTRATIVE EMBODIMENTS

Emulsions of oil-in-water that are most effectively resolved by the method of this invention are oil field emulsions containing relatively small proportions of crude petroleum oil dispersed in water or brine and are hereinafter characterized as oil-in-water emulsions. Other such oil-in-water emulsions include emulsions in which traces of lubricating oil are found dispersed in steam from steam engines and steam pumps often called steam-cylinder emulsions; emulsions encountered in the waxing operations in oil refining, often called wax-hexane-water emulsions; emulsions of flux oil in steam condensate produced in the catalytic dehydrogenation of butylene to produce butadiene; styrene-in-water emulsions; and emulsions generated by sewage disposal operations, metal working fluids, oily waters from ship ballast tanks, food processing waste streams and the like. Although not as advantageously resolved as the oil-in-water emulsions, water-in-oil emulsions are suitably treated by the method of this invention. Such water-in-oil emulsions are generally those naturally occurring emulsions of water and petroleum oil wherein the continuous oil phase has tiny droplets of water dispersed therein.

The preferred oil-in-water emulsions may contain widely different proportions of dispersed phase, for example, the oil field oil-in-water emulsions may carry crude oil in proportions varying from a few parts per million to about 40 weight percent or higher in rare cases. All of such emulsions are advantageously treated in the practice of this invention, most preferably, however, such oil-in-water emulsions contain from about 0.01 to about 30 weight percent of oil based on the weight of the emulsions. Also, while the method of the present invention is effective in treating emulsions derived from light crudes, the method is also effective in treating emulsions of somewhat heavier crudes.

The polyamidoamines employed in the present invention are polymers having amide moieties and amine moieties in their backbones and contain heterocyclic ammonium moieties. By "heterocyclic ammonium" is meant an ammonium moiety that contains a heterocyclic moiety, e.g., oxirane or azetidinium, or a moiety capable of forming a heterocyclic moiety. Those moieties in the backbone are represented by the formula:

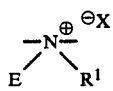

and/or have moieties hereinafter also referred to as $Z^\oplus$. Those moieties which are pendant from the backbone are represented by the formula:

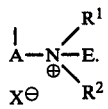

In the foregoing formulas, each $R^1$ and each $R^2$ are independently hydrogen, halohydroxyhydrocarbyl, hydrocarbyl, hydroxyhydrocarbyl or aminohydrocarbyl, wherein amino is a secondary or tertiary amino; E is a monovalent hydrocarbon radical bearing an epoxy group or a group or groups capable of being converted to an epoxy group or E and $R^1$ are collectively a propylene radical or substituted propylene radical

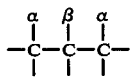

wherein the α-carbon substituents, if any, are $C_1$-$C_3$ alkyl and the β-carbon substituent, if any, is hydroxy, halo, hydrocarbyl or hydroxyhydrocarbyl; A is a divalent organic radical, e.g., alkylene or amidoamino; X is a monovalent or polyvalent anion common to conventional ammonium salts. For the purposes of this invention, the term "hydrocarbyl" is defined as a monovalent hydrocarbon radical such as alkyl, cycloalkyl, aryl, alkenyl and the like. Preferred ammonium polyamidoamines have at least one quaternary ammonium repeating unit represented by the formula:

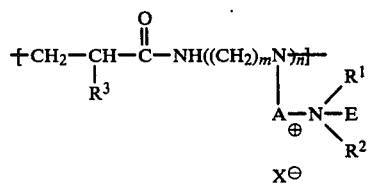

wherein A, E, X, $R^1$ and $R^2$ are as defined before except that neither $R^1$ nor $R^2$ is hydrogen; each $R^3$ is independently hydrogen or lower alkyl, e.g., methyl or ethyl, each m is a whole number from 2 to 6; and n is a whole number from 1 to 3, more preferably 1 or 2, most preferably 1.

Suitable, but less preferred, quaternary ammonium moieties include those represented by the formula:

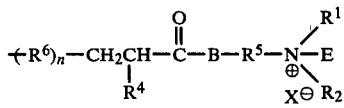

wherein $R^1$, $R^2$, E and $X^\ominus$ are as defined hereinbefore; $R^6$ is a divalent organic radical containing a primary or secondary amine moiety such as amidoamine; B is —NH— or —O—; $R^5$ is a divalent organic radical having at least 2 carbons such as alkylene, e.g., ethylene; and n is 0 or 1.

In the more preferred quaternized heterocyclic ammonium polyamidoamines, A is an amidoamino radical represented by the formula:

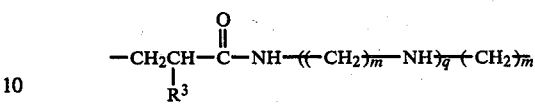

wherein $R^3$ and m are as defined hereinbefore and q is zero or a whole number from 1 to 2; each $R^1$ is independently alkyl, each E is independently oxiranyl or E and $R^1$ are collectively 2-hydroxypropylene. In the most preferred quaternized polyamidoamines, E and $R^1$ are collectively 2-hydroxypropylene such that the pendant quaternary ammonium moiety contains an azetidinium ring and is represented by the formula:

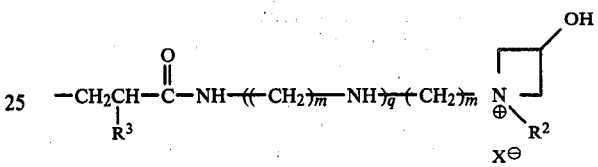

wherein $R^3$ is hydrogen or methyl; m is 2; q is 0, 1, 2 or 3; X is chloride and $R^2$ is alkyl, especially methyl, halohydroxylakyl, especially 3-chloro-2-hydroxypropyl, or epoxy, especially 2,3-epoxypropyl. In the heterocyclic ammonium polyamidoamine, enough heterocyclic ammonium moieties are present to enable the polyamidoamine to function better as a demulsifier for oil-in-water emulsions than the polyamidoamine containing no ammonium moiety. Preferably, the ammonium polyamidoamine contains at least 0.1 mole equivalent, most preferably from about 0.5 to about 1 mole equivalent, of the heterocyclic ammonium moiety per mole equivalent of amine nitrogen in the polyamidoamine. The preferred heterocyclic ammonium polyamidoamines have weight average molecular weights (Mw) in the range from about 1000 to about 100 million, more preferably from about 1000 to about 1 million. Preferably, the ammonium polyamidoamines of this invention are random polymers represented by the statistical formula:

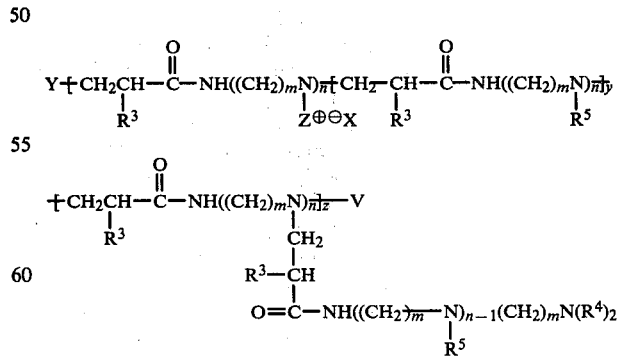

wherein $R^3$, $Z^\oplus$, $X^\ominus$, m and n are as defined hereinbefore; Y is a terminal group characteristic of polyamidoamines; V is a hydrogen or the residue of polymerization to form a polyamidoamine; each $R^4$ is independently hydrogen or lower alkyl, e.g., $C_1$–$C_3$ alkyl; each $R^5$ is independently hydrogen or

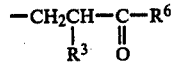

wherein $R^3$ is as defined before and $R^6$ is —$NH_2$; —OH or —$OR^7$ wherein $R^7$ is hydrocarbyl such as alkyl; x is a whole number from 1 to 1000; y is 0 or a whole number from 1 to 200; and z is 0 or a whole number from 1 to 200, provided that the ratio of x to (y+z) is at least 3:1, most preferably at least 10:1.

In the preparation of the heterocyclic ammonium polyamidoamines of this invention, it is preferred to react a linear polyamidoamine or a branched polyamidoamine with epihalohydrin or another compound containing a moiety as defined by E hereinbefore to yield a desired ammonium polyamidoamine having a pendant ammonium moiety containing heterocyclic functionality.

The linear polyamidoamines are conveniently prepared in the manner described in U.S. Pat. No. 3,305,493, the relevant portions of which are incorporated herein by reference. In general, the essentially linear polyamidoamine is prepared by contacting an alkylenediamine or a polyalkylene polyamine with the ethylenically unsaturated carboxylic compound, e.g., alkyl acrylate or methacrylate, acrylamide, acrylic acid or methacrylic acid, under reactive conditions. Preferably, the foregoing reactants are employed in stoichiometric ratio to form a linear polyamidoamine represented by the formula:

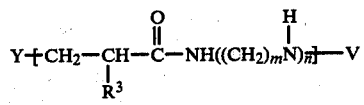

wherein $R^3$, Y, V, m and n are as defined hereinbefore. Advantageously, the linear polyamidoamine has a weight average molecular weight (Mw) of at least about 500, preferably at least 1000, most preferably from about 3000 to about 10,000.

Exemplary alkylene polyamines and polyalkylene polyamines include ethylenediamine, diethylenetriamine, triethylenetetramine, tetraethylenepentamine, pentaethylenehexamine, hexaethyleneheptamine, 1-aminoethylpiperazyl diethylenetriamine, 1-aminoethylpiperazyl triethylenetetramine, propylenediamine, dipropylenetriamine, butylenediamine, aminoethylpropylenediamine and other polyamines having at least one primary amino group separated from another primary amino or secondary amino group by 2 to 4 carbon atoms. Of these polyalkylene polyamines, the higher molecular weight polyethylene polyamines and polypropylene amines such as those having a weight average of 100 to 15,000 are preferred. Of particular interest are the polyalkylene polyamines that are crosslinked with ethylene dichloride or the like as well as mixtures of such cross-linked polyamines with other polyalkylene polyamines and mentioned hereinbefore.

The branched polyamidoamine is preferably prepared by contacting the linear polyamidoamine with an ethylenically unsaturated ester, acid or amide under conditions sufficient to cause a Michael addition reaction between the amino moieties of the polyamidoamine and the ethylenically unsaturated moieties of the ester, acid or amide. Preferably, the unsaturated compound is an alkyl ester of acrylic or methacrylic acid, most preferably methyl acrylate or ethyl acrylate.

The addition of the ethylenically unsaturated compound to the linear polyamidoamine should be performed at a temperature which avoids substantial cross-linking of the polymer. Generally, a temperature in the range from about 0° C. to about 80° C. is operable, with temperatures from about 0° C. to about 50° C. being preferred. This reaction can be conducted neat. However, the presence of a diluent which dissolves the polyamidoamine but is substantially inert to the reactants is desirable as it facilitates more complete mixing and more efficient heat transfer of the reaction medium during the exothermic Michael addition reaction. Water and $C_1$ to $C_4$ alcohols are preferred diluents. Methanol is the most preferred diluent.

The ratio of the equivalents of the aforementioned unsaturated compound to the equivalents of labile hydrogens borne by the nitrogen atoms in the linear polyamidoamine can be varied to produce the desired substitution of pendant ester groups on the polyamidoamine. If complete substitution is desired, a stoichiometric amount or an excess of the alkyl acrylate or other unsaturated compound can be employed. If a lesser degree of substitution is desired, the reactants can be combined in the appropriate ratios and essentially completely reacted. It is preferred that at least about 75 mole percent, most preferably from 90 to 100 mole percent, of the labile hydrogens be reacted with alkyl acrylate or the other unsaturated reactants to endow the ultimate branched polymer with the unique properties and advantages described herein.

The polyamidoamine bearing pendant groups corresponding to the following formula:

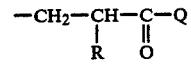

wherein R is —H or —$CH_3$ and Q is —OH, —$NH_2$ or a $C_1$–$C_{10}$ alkoxy is reacted with an alkylene diamine or polyalkylene polyamine as defined hereinbefore to produce the branched polyamidoamines. Prior to introduction of the polyamine, essentially all of the unreacted alkyl acrylate or methacrylate or corresponding acid or amide can be removed by distillation. Preferably only the amount of alkyl acrylate or methylacrylate sufficient to product the desired degree of substitution is added to reaction mixture containing the linear polyamidoamine. A sufficient amount of the polyamine is advantageously employed to suppress premature cross-linking of the polyamidoamine which can occur through the pendant ammonium moieties. Typically, a 200 to 300 mole percent excess of the polyamine relative to the ammonium moieties on the polyamidoamine is sufficient to avoid gelation of the polyamidoamine due to cross-linking.

The conditions necessary to promote reaction of the substituted polyamidoamine with the polyamine will vary dependent on the identity of Q in the pendant groups corresponding to the aforementioned formula. If Q is a $C_1$ to $C_{10}$ alkoxy, the reaction involves a simple amidation of the pendant ester groups on the polyamidoamine which proceeds under relatively mild conditions. This amidation of the ester occurs readily at temperatures in the range from about 20° C. to about 150° C. The amidation of the ester can be performed neat, but an inert diluent in which the reactants are soluble is preferably present. Water is a preferred diluent, but hydrolysis of the ester groups of present can occur at higher reaction temperatures unless an excess of the polyamine reactant is present. Methanol or other lower alkanols are also preferred as diluents.

If Q in the aforementioned formula is —OH or —NH$_2$, more severe reaction conditions must be utilized than when Q is an alkoxy group. Reaction temperatures in the range from about 100° C. to about 200° C. are generally operable, with temperatures of from about 130° to about 170° C. being preferred. Generally, a diluent is not necessary at these reaction conditions because the substituted polyamidoamine is readily agitated at these reaction temperatures.

The branched polyamidoamine is conveniently recovered by distillation of solvents and by-products from the polymer at reduced pressure. The time required to effect substantially complete reaction will vary dependent on the reaction temperature and other factors. Alternatively, the branched polyamidoamine may be ammoniated in the reaction mixture, thereby avoiding expense of removing solvent or by-products in this step.

In the conversion of all or a portion of the amine moieties of the linear or branched polyamidoamine to ammonium form, the linear or branched polyamidoamine is contacted with an alkylating agent, a mixture of alkylating agents or other agents capable of converting the amine to ammonium form such that the pendant amino nitrogens of the branched polyamidoamine and the linear polyamidoamines are converted to ammonium moieties represented by the following formula:

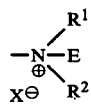

and/or the available backbone amine moieties are converted to ammonium moieties represented by the formula:

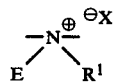

wherein each $R^1$, $R^2$, E and $X^\ominus$ are as defined hereinbefore.

In the preparation of the more preferred quaternized polyamidoamines, the linear or branched polyamidoamine is reacted with an epoxy compound such as an epihalohydrin or an azetidinium forming compound such as a 1,3-dihaloalkane under conditions sufficient to cause the amine groups of the polyamidoamine to be alkylated. It is preferred to carry out this alkylation reaction in a solvent. If a solvent system is used in the formation of the polyamidoamine, then the same solvent or water diluted solvent may be used in the alkylation reaction. Thus, water, lower alkanols such as methanol and mixtures thereof are preferred solvents for the alkylation reaction. In general, sufficient solvent is employed to just solubilize the reactants and to permit easy stirring. Generally, solutions containing from about 30 to about 75 weight percent of the polyamidoamine are employed. Following dissolution of the polyamidoamine, the epihalohydrin or other suitable alkylating agent is added. In the case of epihalohydrin, the reaction is preferably carried out at temperatures in the range from about 0 up to about 35° C. The resulting alkylated polyamidoamine, which is prepared using epihalohydrin, contains an epoxy group and/or halohydrin groups in the quaternary ammonium moiety. This material may be employed as is as a demulsifier. Alternatively, all or a portion of such ammonium groups may be converted to azetidinium rings by dilution with water and heating. Residual halohydrin groups may be converted to epoxy groups by contacting this material with a neutralizing agent for acid such as sodium hydroxide, calcium carbonate, sodium carbonate, sodium bicarbonate and the like under conditions described by Weissberger in "Heterocyclic Compounds with Three and Four Membered Rings," Interscience Publishers, Part 2, page 891 (1964). In instances wherein it is desirable to prepare a quaternary ammonium compound in which the amino nitrogen is substituted with an alkyl or hydroxylakyl group in addition to an epoxy group or an azetidinium ring, the branched polyamidoamine may be first alkylated with an alkyl halide or hydroyalkyl halide or alkylene oxide and then subsequently alkylated with epihalohydrin.

In the practice of this invention, the emulsion to be resolved is contacted with an amount of the curable ammonium polyamidoamine which is effective to cause the emulsion to separate into two essentially distinct phases upon standing. Generally, such an amount will be in the range from about 1 to about 10,000 weight parts of the adduct per million weight parts (ppm) of the emulsion, preferably from about 3 to about 1000 ppm, more preferably from 5 to 300 ppm, most preferably from 5 to 50 ppm. It should also be understood that factors such as reagents, feed rates, agitation and settling time are interrelated. For example, control of agitation at an optimum level often shortens settling time. Agitation may be achieved by a variety of means, e.g., passing air or other gas through the emulsion.

The following examples are given to further illustrate the detailed practice of the invention and should not be construed as limiting its scope. Unless otherwise indicated, all parts and percentages are by weight.

EXAMPLE 1

A. Preparation of Linear Polyamidoamines

Into a 250-ml three-neck round bottom flask equipped with a reflux condenser, air driven stirrer and addition funnel is charged 60.1 g (1 mole) of ethylenediamine. To the flask is then added with stirring 86.09 g (1 mole) of methyl acrylate by dripping it slowly into the flask over a period of 35 minutes. The temperature of the reaction mixture rises to 70° C. during this addition and analysis of the reaction mixture using proton nuclear magnetic resonance indicates that all of the double bond has disappeared. The reflux condenser and addition funnel are replaced with a nitrogen sparge and a distillation apparatus. Using a steam bath, the reaction mixture is heated to 90°–95° C. for a reaction time of 24 hours. After this time, the reaction mixture is a very viscous, light yellow amorphous solid. Analysis of this reaction mixture indicates that all of the ester moieties have reacted thereby yielding linear polyamidoamines having a weight average molecular weight (Mw) as determined by light scattering of 4,000. Following the foregoing procedure except using a reaction time in excess of 48 hours, a linear polyamidoamine having an Mw of 12,000 is prepared.

B. Preparation of Branched Polyamidoamine

The aforementioned linear polyamidoamine having an Mw of 12,000 is diluted with water to 65 percent solids. A 50-g portion of this solution is charged into a 250 ml three-neck round bottom flask equipped with stirrer and reflux condenser and 24.54 g (stoichiometric amount with respect to amino hydrogens of the linear polyamidoamine) of methyl acrylate is added at one time. The temperature of the reaction mixture increases from ambient to 35° C. and is then heated with stirring at 80° C. for four hours. Analysis of the reaction mixture at this point indicates approximately 95 percent of the methyl acrylate has been added to the polymer to provide a linear polyamidoamine having carboxylate ester branches. To this material is added approximately 70 g of ethylenediamine (4 moles of ethylenediamine per mole of ester) and the heating of the reaction mixture is continued for an additional four hours. Analysis of this mixture using proton NMR indicates complete conversion of the ester moieties to amide moieties. Excess ethylenediamine, methanol and water are removed using a water aspirator vacuum at 60°–95° C.

C. Quaternization of Linear Polyamidoamine

Into a 250 ml, three-neck round bottom flask equipped with an air driven stirrer and thermometer is charged 22.23 g of a 65 percent solution of the aforementioned linear polyamidoamine having an Mw of 4,000. The flask is cooled to 5° C. and 11.19 g of epichlorohydrin (epi) (1:1 mole ratio of amine hydrogen to epi) is added with stirring to the flask. The reaction mixture is allowed to warm to room temperature over a 5-hour period and then stirred for 2 hours. To the flask is added 68 g of water heated to 65° C. The resulting stirred mixture is heated at 65° C. for 1 hour to yield a clear solution and then allowed to cool to room temperature. An ~100 percent quaternized linear polyamidoamine (Demulsifier A) is recovered.

D. Quaternization of EDC/Cross-linked Linear Polyamidoamine

Using the linear polyamidoamine and procedure of the foregoing paragraph C, the polyamidoamine is (1) contacted with 5.8 mole percent of ethylene dichloride (EDC) to increase the Mw of the polyamidoamine to ~30,000 and (2) reacted with epichlorohydrin solution to form the quaternized derivative (Demulsifier B).

E. Quaternization of Branched Polyamidoamine

For purposes of comparison, 10.61 g of a 65 percent solid solution of a 100 percent branched polyamidoamine made by the foregoing procedure and 5.60 g of epichlorohydrin (1:1 ratio of amine hydrogens to epichlorohydrin) to yield a polymer (Demulsifier C) containing quaternary moieties represented by the following formula:

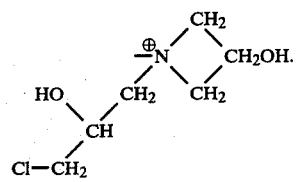

To 22.18 g of a 20 percent solution of this polymer in water is added 0.59 g of an aqueous solution of 50 percent sodium hydroxide and then maintained at room temperature for 6 days. Analysis of the resulting product indicates formation of a (Demulsifier D) polymer having quaternary moieties represented by the following formula:

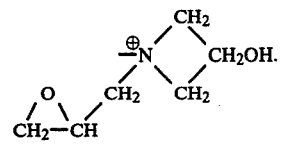

F. Demulsification

To 10 grams of an oil-in-water emulsion containing about 10 weight percent of crude oil having a specific gravity of ~0.8 g/ml is added about 7.4 parts per million based on the emulsion of the aforementioned Demulsifier A. The emulsion is then shaken on a wrist-action shaker for 5 minutes to effectively disperse the quaternized polyamidoamine into the emulsion. Thereafter, the emulsion is allowed to stand for 1 minute, visually evaluated and allowed to stand for 24 hours and then visually evaluated again.

The results of these evaluations are reported Table I.

For purposes of comparison, the aforementioned Demulsifiers B-D and nonquaternized polyamidoamine (Demulsifier E) are similarly tested as demulsifiers at various concentrations and the results are reported in Table I.

TABLE I

| Sample No. | Demulsifier (1) | | | | Performance Rating (2) | |
|---|---|---|---|---|---|---|
| | Type | Mw | Mole Ratio of Quat to Amine | Concentration, ppm | After One Minute | After 24 Hours |
| 1 | A | 4,000 | 1:1 | 2.4 | 3 | 2 |
| | | | 1:1 | 4.9 | 2 | 2 |
| | | | 1:1 | 12.2 | 1 | 1 |
| | | | 1:1 | 24.5 | 1 | 1 |
| 2 | B | 30,000 | 1:1 | 2.4 | 4 | 1 |
| | | | 1:1 | 4.9 | 1 | 1 |
| | | | 1:1 | 12.2 | 1 | 1 |
| | | | 1:1 | 24.5 | 2 | 1 |
| 3 | C | 12,000 | 1:2 | 2.4 | 4 | 3 |
| | | | 1:2 | 7.4 | 1 | 1 |
| | | | 1:2 | 12.2 | 2 | 1 |
| | | | 1:2 | 24.5 | 3 | 3 |
| 4 | D | 12,000 | 1:1 | 2.4 | 4 | 3 |
| | | | 1:1 | 7.4 | 1 | 1 |
| | | | 1:1 | 12.2 | 2 | 1 |
| | | | 1:1 | 24.5 | 3 | 3 |
| C₁* | E | 12,000 | 1:1 | 2.4 | 5 | 5 |
| | | | 1:1 | 7.4 | 3 | 2 |
| | | | 1:1 | 12.2 | 2 | 1 |
| | | | 1:1 | 24.5 | 1 | 1 |

*Not an example of the invention.
(1) Base polymer in all samples are linear polyamidoamines having the weight average molecular weights (Mw) as specified. The Mw for each polymer is as determined by low angle laser light scattering and the mole ratio of quaternary ammonium moiety to amino moiety as indicated in the table. The concentration of the polymer in the emulsion is given in parts per million.
(2) Performance rating based on visual evaluation with the ratings having the following meanings:
1—excellent resolution of the emulsion - clear aqueous phase and well defined interface, bright oil.
2—good resolution - slight cloudy aqueous phase and well defined interface.
3—marginal resolution - cloudy aqueous phase and poorly defined interface.
4—poor resolution - nearly opaque aqueous phase and little, if any, oil phase.
5—not active - treated emulsion essentially the same as untreated emulsion.

Sample No. C₁ in Table I is a nonquaternized linear polyamidoamine. Sample Nos. 3 and 4 are quaternized branched polyamidoamines of the present invention, having been derived from Sample No. $C_1$. Sample Nos. 1 and 2 are quaternized linear polyamidamines derived from a linear polyamidoamine having an Mw of 4,000

As evidenced in Table I, the quaternized polyamidoamines more efficiently demulsify the oil-in-water emulsion. Typically, excellent performance is obtained at one-half the concentration required by the nonquaternized polyamidoamines of equivalent Mw.

We claim:

1. A demulsification method which comprises contacting an emulsion of oil and water with a demulsifying amount of a water-soluble ammonium polyamidoamine having amide and amine moieties in its backbone and heterocyclic ammonium moieties or an ammonium moiety capable of forming a heterocyclic moiety in its backbone and/or pendant therefrom.

2. The method of claim 1 wherein the emulsion is an oil-in-water emulsion.

3. The method of claim 1 wherein the heterocyclic ammonium moiety or the ammonium moiety capable of forming the heterocyclic moiety is represented by the formulas:

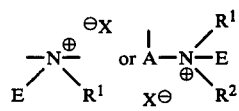

wherein each $R^1$ and each $R^2$ are independently hydrogen, halohydroxyhydrocarbyl, hydrocarbyl, hydroxyhydrocarbyl or aminohydrocarbyl wherein amino is a secondary or tertiary amino; E is a monovalent hydrocarbon radical bearing an epoxy group or a group or groups capable of being converted to an epoxy group or E and $R^1$ are collectively a propylene radical or substituted propylene radical wherein the α-carbon substituents are $C_1$-$C_3$ alkyl and the β-carbon substituent is hydroxy, halo, hydrocarbyl or hydroxyhydrocarbyl; A is a divalent organic radical; and X is a monovalent or polyvalent anion common to conventional ammonium salts.

4. The method of claim 3 wherein the polyamidoamine contains a repeating unit represented by the formula:

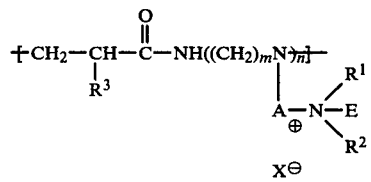

wherein each $R^1$ and each $R^2$ are independently hydrocarbyl, hydroxyhydrocarbyl or aminohydrocarbyl wherein the amino is a secondary or tertiary amino; E is a monovalent hydrocarbon radical bearing an epoxy group or a group or groups capable of being converted to an epoxy group or E and $R^1$ are collectively a propylene radical or substituted propylene radical wherein the α-carbon substituents are $C_1$-$C_3$ alkyl and the β-carbon substituent is hydroxy, halo, hydrocarbyl or hydroxylhydrocarbyl; A is a divalent organic radical, X is a monovalent or polyvalent anion common to conventional ammonium salts; each $R^3$ is independently hydrogen or lower alkyl; each m is a whole number from 2 to 6; and n is a whole number from 1 to 3.

5. The method of claim 3 wherein the polyamidoamine is a random polymer represented by the statistical formula:

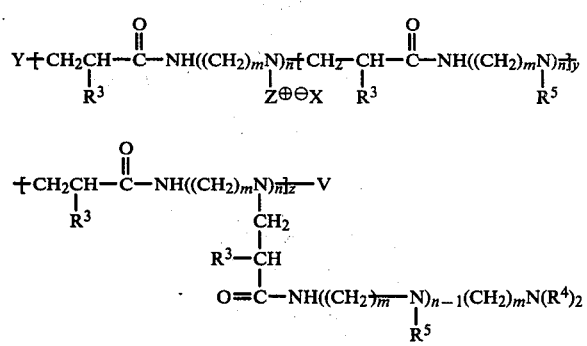

wherein Z is the heterocyclic ammonium moiety or the ammonium moiety capable of forming the heterocyclic moiety; each $R^3$ is independently hydrogen or methyl; each $R^4$ is independently hydrogen or lower alkyl; each $R^5$ is independently hydrogen or

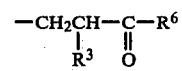

wherein $R^6$ is $NH_2$, OH or $OR^7$ is hydrocarbyl; Y is a terminal group characteristic of a polyamidoamine; V is hydrogen or the residue of polymerization to form a polyamidoamine; each m is a whole number from 2 to 6; n is 1 or 2; x is a whole number from 1 to 1000; y is 0 or a whole number from 1 to 200; and z is 0 or a whole number from 1 to 200, provided that the ratio of x to (y+z) is at least 3:1.

6. The method of claim 3 wherein the pendant heterocyclic ammonium moiety is represented by the formula:

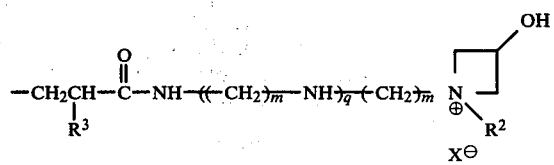

and the backbone heterocyclic ammonium moiety is represented by the formula:

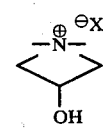

wherein $R^3$ is hydrogen or methyl; m is 2; q is 0, 1, 2 or 3; X is chloride and $R^2$ is alkyl, halohydroxyalkyl or epoxy.

7. The method of claim 3 wherein the heterocyclic ammonium moiety is a backbone moiety represented by the formula:

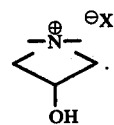
8. The method of claim 3, 4 or 5 wherein $R^3$ is hydrogen and $R^2$ is 3-chloro-2-hydroxypropyl or 2,3-epoxypropyl.
9. The method of claim 4 wherein the heterocyclic ammonium moiety is represented by the formula:
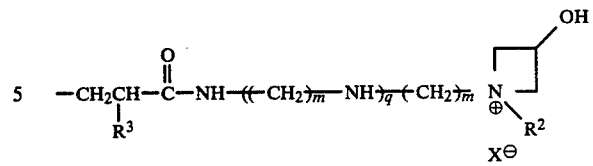
wherein $R^3$ is hydrogen or methyl; m is 2; q is 0, 1, 1 or 3; X is chloride and $R^2$ is alkyl, halohydroxyalkyl or epoxy.
* * * * *